(12) United States Patent
Nagarajan et al.

(10) Patent No.: US 9,759,877 B2
(45) Date of Patent: *Sep. 12, 2017

(54) PACKAGE STRUCTURE FOR PHOTONIC TRANSCEIVING DEVICE

(71) Applicant: INPHI CORPORATION, Santa Clara, CA (US)

(72) Inventors: Radhakrishnan L. Nagarajan, Santa Clara, CA (US); Peng-Chih Li, Santa Clara, CA (US); Masaki Kato, Palo Alto, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/375,042

(22) Filed: Dec. 9, 2016

(65) Prior Publication Data

US 2017/0090132 A1    Mar. 30, 2017

Related U.S. Application Data

(63) Continuation of application No. 14/793,636, filed on Jul. 7, 2015, now Pat. No. 9,553,671.

(51) Int. Cl.
| | | |
|---|---|---|
| *H04B 10/00* | (2013.01) | |
| *G02B 6/42* | (2006.01) | |
| *H04B 10/40* | (2013.01) | |

(52) U.S. Cl.
CPC ............ *G02B 6/4246* (2013.01); *G02B 6/428* (2013.01); *G02B 6/4256* (2013.01);
(Continued)

(58) Field of Classification Search
CPC .... H04B 10/40; H04B 10/516; G02B 6/4246; G02B 6/4256; G02B 6/4292; G02B 6/4278; G02B 6/428
(Continued)

(56) References Cited

U.S. PATENT DOCUMENTS 4,647,148 A * 3/1987 Katagiri ............. H01L 31/0203
250/239
7,300,215 B2 * 11/2007 Hsiao .................. G02B 6/4201
385/139
(Continued)

FOREIGN PATENT DOCUMENTS

CN    WO 2016201618 A1 * 12/2016 ........... H05K 9/0058

*Primary Examiner* — Juan A Torres
(74) *Attorney, Agent, or Firm* — Richard T. Ogawa; Ogawa P.C.

(57) ABSTRACT

A photonic transceiver apparatus in Quad Small Form-factor Pluggable (QSFP) package. The apparatus includes a case having a base member, two partial side members, and a lid member to provide a spatial volume with an opening at a back end of the base member. Additionally, the apparatus includes a printed circuit board (PCB), installed inside the spatial volume over the base member having a pluggable electrical connector at the back end. Further, the apparatus includes multiple optical transmitting devices in mini-transmit-optical-sub-assembly package, each being mounted on a common support structure and having a laser output port in reversed orientation toward the back end. Furthermore, the apparatus includes a silicon photonics chip, including a fiber-to-silicon attachment module, mounted on the PCB and coupled to a modulation driver module and a transimpedance amplifier module. Moreover, the apparatus includes a pair of optical input/output ports being back connected to the fiber-to-silicon attachment module.

25 Claims, 7 Drawing Sheets

(52) U.S. Cl.
CPC ......... *G02B 6/4278* (2013.01); *G02B 6/4292* (2013.01); *H04B 10/40* (2013.01)

(58) Field of Classification Search
USPC ....................................................... 398/135
See application file for complete search history.

(56) References Cited

U.S. PATENT DOCUMENTS

| | | | | |
|---|---|---|---|---|
| 7,367,719 | B1* | 5/2008 | Liburdi | G02B 6/4201 385/89 |
| 7,917,037 | B2* | 3/2011 | Liu | G02B 6/4277 398/135 |
| 2008/0145006 | A1* | 6/2008 | Ice | G02B 6/4201 385/93 |
| 2009/0028557 | A1* | 1/2009 | Togami | H05K 9/0058 398/39 |
| 2009/0211801 | A1* | 8/2009 | Edwards | H05K 9/0058 174/377 |
| 2013/0071072 | A1* | 3/2013 | Xie | G02B 6/4277 385/92 |
| 2014/0202755 | A1* | 7/2014 | Ito | H05K 9/0018 174/359 |
| 2015/0125162 | A1* | 5/2015 | Pfnuer | H04B 10/503 398/201 |

* cited by examiner

PACKAGE STRUCTURE FOR PHOTONIC TRANSCEIVING DEVICE

CROSS-REFERENCE TO RELATED APPLICATIONS

This application is a continuation of and claims priority to U.S. application Ser. No. 14/793,636 filed Jul. 7, 2015, commonly assigned and incorporated by reference herein for all purposes.

BACKGROUND OF THE INVENTION

The present disclosure is related to a photonic transceiver package structure, more particularly, to a silicon photonic transceiver package structure which conforms to the Quad Small Form-factor Pluggable (QSFP) specification adapted for multiple mini-transmit optical sub-assembly (TOSA) laser devices disposed with output in opposite direction relative to transceiver module optical input/output port.

As science and technology are updated rapidly, processing speed and capacity of the computer increase correspondingly. The communication transmission or reception using the traditional cable is limited to bandwidth and transmission speed of the traditional cable and mass information transmission required in modern life causes the traditional communication transmission overload. To correspond to such requirement, the optical fiber transmission system replaces the traditional communication transmission system gradually. The optical fiber transmission system does not have bandwidth limitation, and also has advantages of high speed transmission, long transmission distance, its material not interfered by the electromagnetic wave. Therefore, present electronic industrial performs research toward optical fiber transmission which will become the mainstream in the future. Said optical communication is a technology in that light wave functions as signal carrier and transmitted between two nodes via the optical fiber. Field of the optical communication can be divided into optical communication side and electric communication side according to transmission medium. By the optical transceiver, the received optical signal can be converted to an electrical signal capable of being processed by an IC, or the processed electrical signal can be converted to the optical signal to be transmitted via optical fiber. Therefore, objective of communication can be achieved.

Wavelength-division multiplexing (WDM) is a multitask technology of processing multiple optical carrier signals transmitted by the optical fiber, and this technology is applied on the different wavelength signal or transmission of laser optical source. This technology is implemented in both directions on the optical fiber to double total transmission capacity. Besides, the term "wavelength-division multiplexing" is mostly applied in optical carrier, and frequency-division multiplexing is applied in radio carrier. Moreover, both of wavelength and frequency are in reciprocal relationship, so their concept can be applied to each other.

Wavelength-division multiplexing is implemented by dividing the work wavelength of optical fiber into multiple channels to enable mass data transmission in one optical fiber. A whole wavelength-division multiplexing (WDM) system can be divided into a wavelength division multiplexer at transmitting end and a wavelength division demultiplexer at receiving end. At present, there are commercial wavelength division multiplexer/demultiplexer which can divide 80 or more channels in the optical fiber communication system, so that the data transmission speed can exceed grade of Tb/s effectively.

In both transmitting and receiving ends of the optical fiber communication system, the transmitting module adapted for WDM technology, the connector usually has single light transmitter structure. However, such light transmitter structure can emit optical signals with different frequencies, but cannot be repaired for individual frequency. Therefore, whole light transmitter must be replaced if being damaged, and it causes larger consumption in cost.

BRIEF SUMMARY OF THE INVENTION

The present disclosure is related to a photonic transceiver package structure, more particularly, to a silicon photonic transceiver package structure that conforms to the QSFP specification adapted with multiple mini-TOSA laser devices disposed with output in opposite direction relative to transceiver optical input/output port. In certain embodiments, the invention is applied for high bandwidth optical communication, though other applications are possible.

In modern electrical interconnect systems, high-speed serial links have replaced parallel data buses, and serial link speed is rapidly increasing due to the evolution of CMOS technology. Internet bandwidth doubles almost every two years following Moore's Law. But Moore's Law is coming to an end in the next decade. Standard CMOS silicon transistors will stop scaling around 5 nm. And the internet bandwidth increasing due to process scaling will plateau. But Internet and mobile applications continuously demand a huge amount of bandwidth for transferring photo, video, music, and other multimedia files. This disclosure describes techniques and methods to improve the communication bandwidth beyond Moore's law.

Serial link performance is limited by the channel electrical bandwidth and the electronic components. In order to resolve the inter-symbol interference (ISI) problems caused by bandwidth limitations, we need to bring all electrical components as close as possible to reduce the distance or channel length among them. Stacking chips into so-called 3-D ICs promises a one-time boost in their capabilities, but it's very expensive. Another way to achieve this goal in this disclosure is to use multiple chip module technology.

In an example, an alternative method to increase the bandwidth is to move the optical devices close to electrical device. Silicon photonics is an important technology for moving optics closer to silicon. In this patent application, we will disclose a high speed electrical optics multiple chip module device to achieve terabits per second speed, as well as variations thereof.

In a specific embodiment, the present invention provides a photonic transceiver apparatus in QSFP package. The apparatus includes a case, comprising a base member, two partial side members being connected by a joint piece and coupled to the base member, a lid member including a cover coupled to the two partial side members. The base member is to provide a spatial volume with an opening at a back end of the base member. Additionally, the apparatus includes a printed circuit board (PCB), installed inside the spatial volume over the base member. The PCB includes a board body extended from a front edge to a back edge. The back edge is near the opening at the back end of the base member and the board body includes an array of metallic pin stripes at the back edge to form a pluggable electrical interface connector. The apparatus further includes multiple optical transmitting devices mounted in parallel on a common support member resting on the PCB near the front edge with corresponding laser output port aligned toward the back edge. Furthermore, the apparatus includes a silicon photonics chip, mounted on the PCB, including a fiber-to-silicon attachment module to couple with a first fiber from each of the laser output port. Moreover, the apparatus includes an optical input port and an optical output port disposed together on a front end of the base member near the joint piece for the two partial side members. Each of the optical input port and optical output port is back connected via a second fiber to the fiber-to-silicon attachment module.

Therefore, the present disclosure has at least following advantages. First, the package structure for the photonic transceiver of the present disclosure can be detached independently, so that assembly engineer can replace single photonic transceiver in failure. Secondly, the PCB board and cylindrical element of a transmitting laser device of the present disclosure can be detached and detected individually, so that the cylindrical element provided with the coupling lens can be recycled for reuse when the transmitting module is damaged. Thirdly, the reversed output orientation of the transmitting laser device relative to the transceiver output port provides easy access for the laser output fiber to couple with a silicon photonics chip on the PCB.

The present invention achieves these benefits and others in the context of known memory technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

The present disclosure is related to a photonic transceiver package structure, more particularly, to a silicon photonic transceiver package structure in QSFP specification adapted with multiple mini-TOSA laser devices disposed with reversed output orientation relative to transceiver optical input/output port. In certain embodiments, the invention is applied for high bandwidth optical communication, though other applications are possible.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Figure 1A:
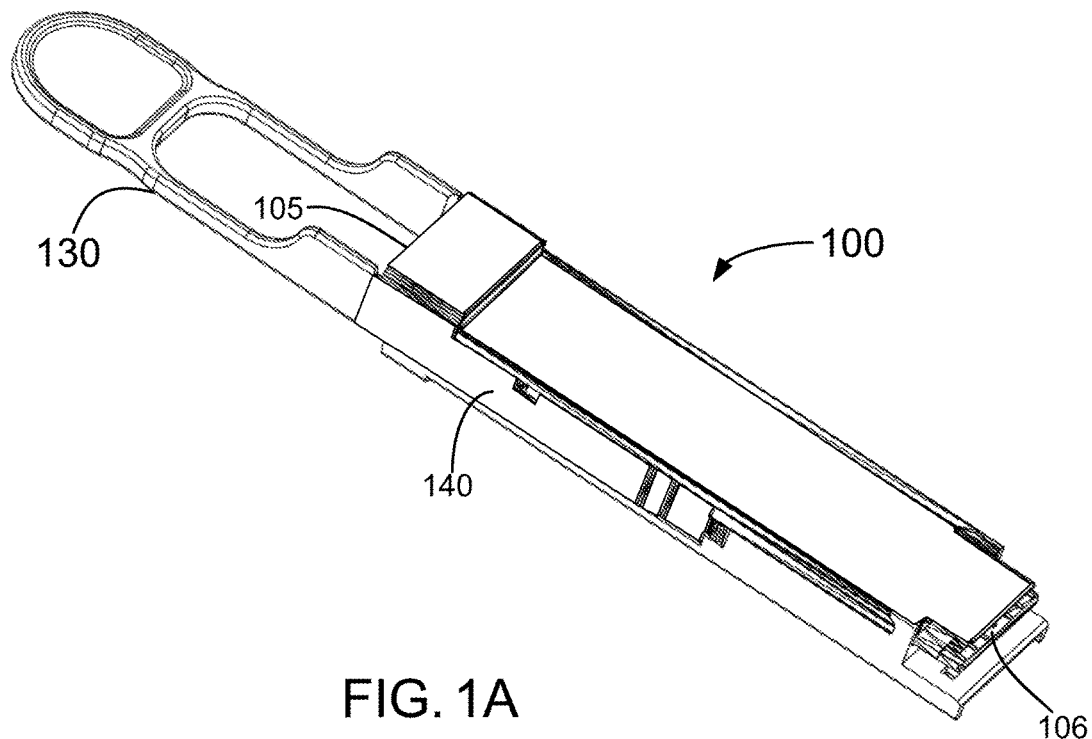
FIG. 1A is a perspective bottom view of a photonic transceiver package structure with lid according to an embodiment of the present invention.

FIG. 1A is a schematic bottom view of a photonic transceiver package structure with lid member according to an embodiment of the present invention. As shown, the photonic transceiver package structure is compatible with the Quad Small Form-factor Pluggable (QSFP) specification, which is designed for a compact small form factor, hot-pluggable photonic transceiver package 100 used for high speed data communications applications. Technically, the small form factor pluggable transceiver 100 allows data rates of 4×10 Gbit/s, 4×28 Gbit/s or higher. A handle part 130 is included at the front end 105 for easy handling of plugging or unplugging of the photonic transceiver package 100 (with a photonic transceiver installed within the package structure but not visible yet in this figure) into or out of a port of communication network system terminals such as routers, switches, and transport gears. At the same front end 105, a pair of optical ports (one input and out output, not visible in FIG. 1A and will be shown later) of the QSFP packaged transceiver are disposed.

Figure 1B:
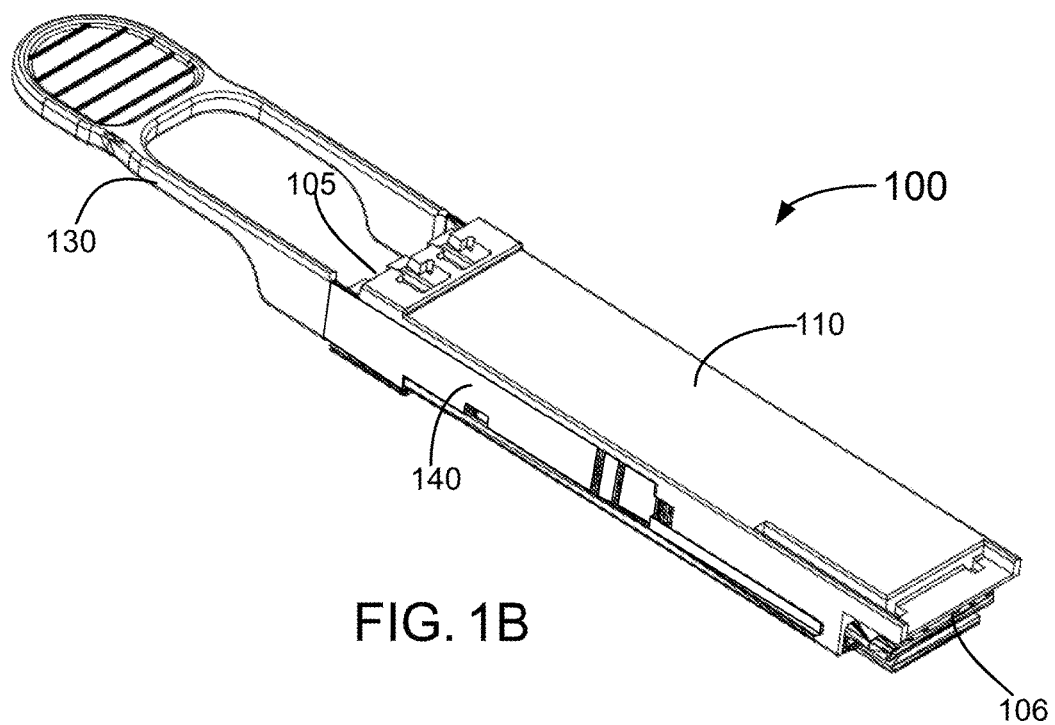
FIG. 1B is a perspective top view of a photonic transceiver package structure with lid according to the embodiment of the present invention.

FIG. 1B is a schematic top view of a photonic transceiver package structure with lid member according to the embodiment of the present invention. The top view shows a removable lid member 110 still been placed for the photonic transceiver 100 on the side members 140 of the QSFP package structure. The electrical connection on a PCB is barely visible at the back end 106 of the QSFP package structure for connecting with system terminals via a simple plug-in operation.

Figure 2A:
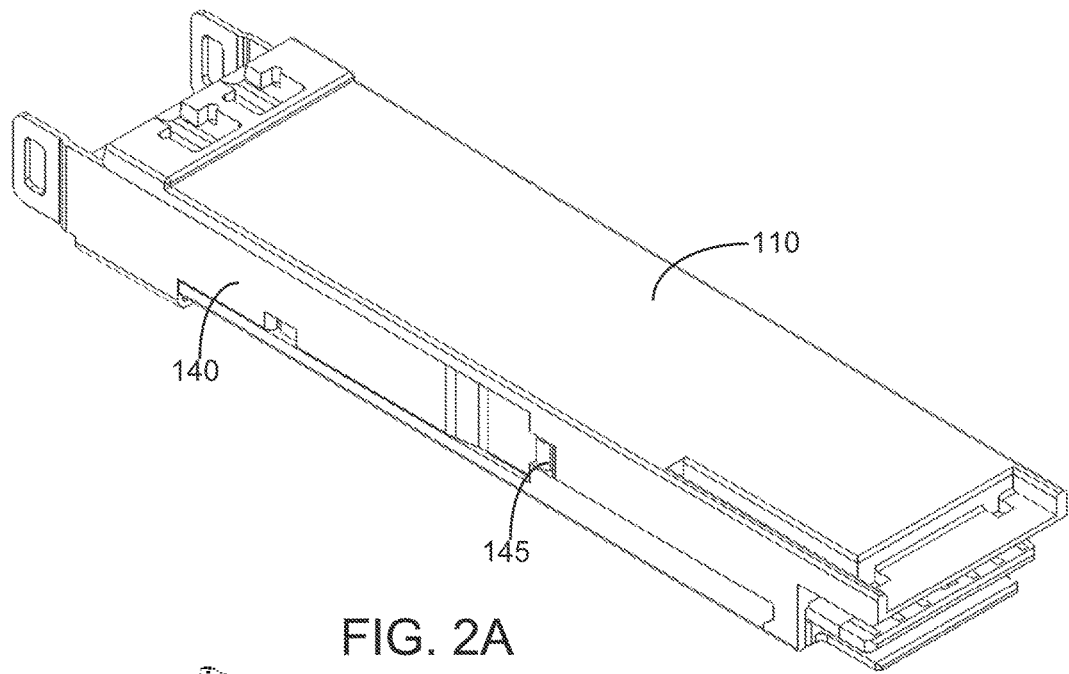
FIG. 2A is a perspective top view of a photonic transceiver package structure without handle part but with lid member according to the embodiment of the present invention.
Figure 2B:
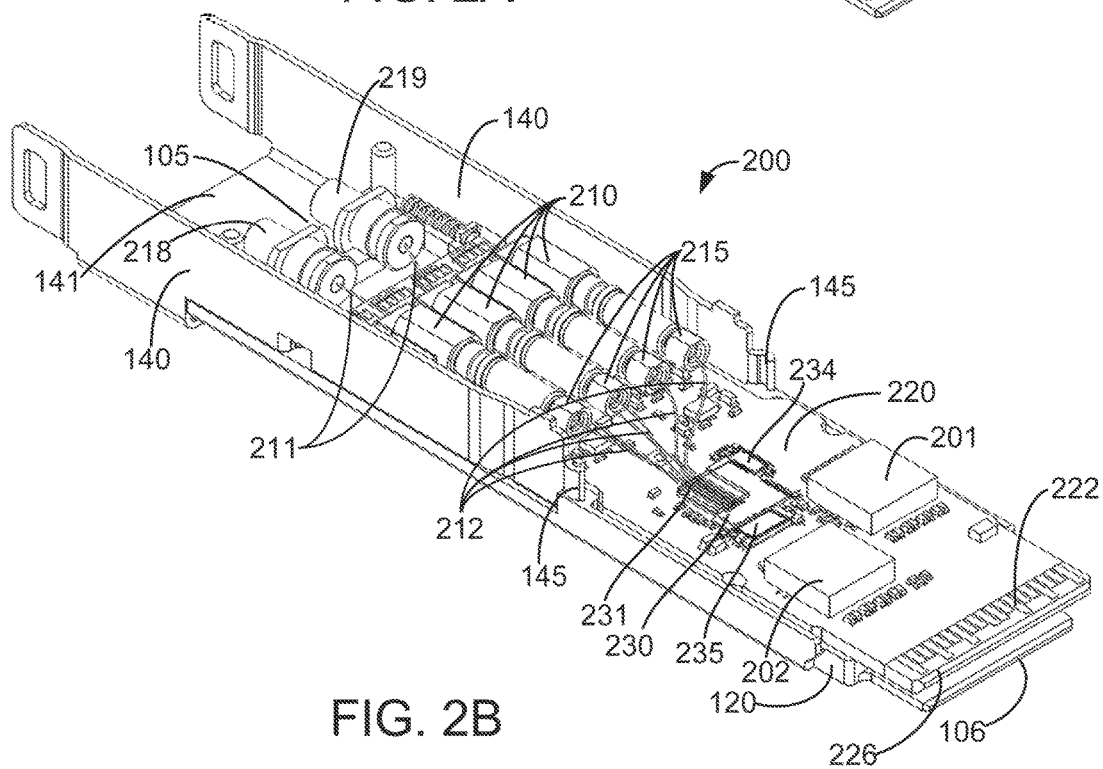
FIG. 2B is a perspective top view of a photonic transceiver package structure without lid member according to the embodiment of the present invention.

FIG. 2A is a schematic top view of a photonic transceiver package structure with a lid member in position according to the embodiment of the present invention. This diagram is merely an example, which should not unduly limit the scope of the claims. One of ordinary skill in the art would recognize many variations, alternatives, and modifications. The handle part has been removed from the package structure. FIG. 2B is a schematic top view of a photonic transceiver package structure without handle part and lid member according to the embodiment of the present invention. This diagram is merely an example, which should not unduly limit the scope of the claims. One of ordinary skill in the art would recognize many variations, alternatives, and modifications. As shown, the lid member 110 has been removed from a clip structures 145 on the side member 140 to reveal the inside package layout of the photonic transceiver 200. In an embodiment, the side member 140 has two vertical pieces coupled to side edges of a base member 120. The two vertical pieces 140 are connected by a horizontal joint piece 141 leveled with the base member 120. The joint piece 141 is located near a front end of the base member 120. In another embodiment, the lid member 110 includes a cover and a pair of partial side pieces to couple with the base member 120 to provide a space volume that can hold the photonic transceiver 200 therein, which is revealed in FIG. 2B, while leaving an opening at a back end 106 of the base member 120.

As shown in FIG. 2B, the photonic transceiver 200 includes two optical ports 218, 219 and a PCB 220 mounted on the base member. One optical port 218 is designed as optical input port for the transceiver 200 and another port 219 is an optical output port. Both optical ports are disposed in parallel along length direction near a front end region of the base member 120, just recessed from the horizontal joint piece 141 for the side member 140. The front side of the optical input port 218 and optical output port 219 are respective part of two optical connectors, such as typical LC connector or other suitable connectors used in the industry. For example, a paired multi-fiber push on (MPO) or LC connector can be used, one fiber for the optical input port 218 and another fiber for optical output port 219. Each of the paired module input/output ports is back connected by an optical fiber 211 for internal connection in the photonic transceiver 200. The PCB 220 is located a short distance away from the two optical ports 218 and 219 and extended toward the back end 106 of the base member 120 of the photonic transceiver package 100.

Referring to FIG. 2B, additionally, several elements for the photonic transceiver 200 are mounted on the PCB 220. First of all, multiple transmitting devices 210 are grouped together and mounted near the front part of the PCB 220. In a specific embodiment, four such transmitting devices are installed. In a specific embodiment, each transmitting device 210 is a laser device, or particularly here is a mini-TOSA (mini transmit optical sub-assembly) laser device. As shown, each mini-TOSA laser device 210 is installed with its laser output port 215 orientated in opposite direction of the two optical ports 218 and 219 so that each laser output port 215 has a fiber 212 coming out towards the back end 106. The fiber 211 from the optical input/output ports 218/219 is laid under the transmitting device 210. Both fiber 212 and fiber 211 are then configured to couple with a fiber-to-silicon attachment module 231 of a silicon photonics chip 230 which is mounted in the middle of the PCB 220. The silicon photonics chip 230 is coupled to two modules, a driver module 234 and a TIA (trans-impedance amplifier) module 235 for independently processing electrical/optical signals of the photonic transceiver 200. Furthermore, two ASIC chips 201 and 202 are mounted on the PCB 220 near the back edge 226 to control electrical interface for communication with network system via multiple metallic pin stripes 222 disposed at the back edge 226 of the PCB 220, which will be accessible for plugging into a system apparatus through the opening near the back end 106 of the photonic transceiver package 100 when the lid member 110 is placed back.

Figure 3:
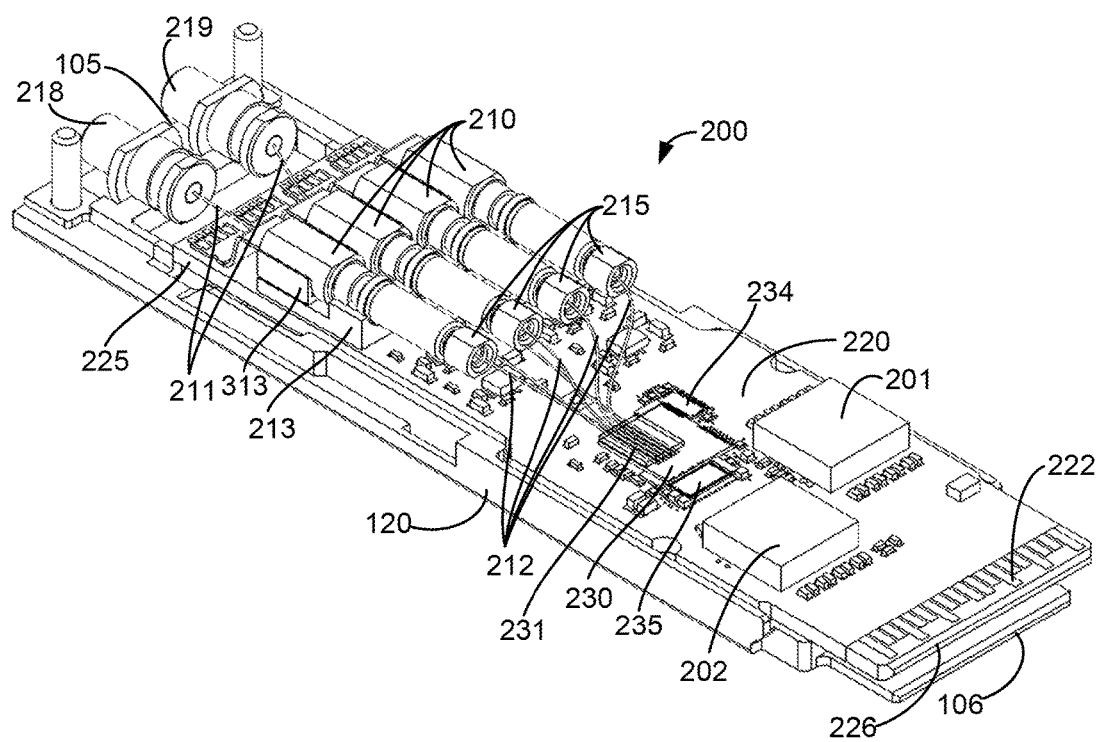
FIG. 3 is a perspective top view of a photonic transceiver on a circuit board according to the embodiment of the present invention.

FIG. 3 is a schematic top view of a photonic transceiver without handle part, lid member, and side members of the package structure according to the embodiment of the present invention. This diagram is merely an example, which should not unduly limit the scope of the claims. One of ordinary skill in the art would recognize many variations, alternatives, and modifications. As shown, the handle part 130 and side members 140 are also removed from a base member 120 of the photonic transceiver package. PCB 220 and a pair of optical input/output ports 218/219 for the photonic transceiver 200 are disposed on the base member 120.

In an embodiment, the photonic transceiver 200 includes four transmitting devices 210 installed on the PCB 220 near its front edge 225. In a specific embodiment, each of the transmitting devices 210 is a mini-TOSA laser device. Each mini-TOSA laser device 210 is configured (via a transmitting module inside) to produce one laser light at a specific wavelength belonging to coarse-wavelength-division-multiplexing channels without any TEC module, outputted through a laser output port 215 with a single-mode optical fiber 212 and is coupled into a fiber-to-silicon photonics attachment module 231 pre-fabricated on the silicon photonics chip 230 which is mounted on the middle region of PCB 220. The fiber-to-silicon photonics attachment module 231 includes multiple V-grooves for coupling the optical fibers with silicon waveguides (not visible) through which the light received externally can be can be directly guided to a MZ modulator per channel (not visible in FIG. 3) capable of operating under PAM4 and NRZ protocol. In other words, this silicon photonics chip 230 is, contrary to some conventional photonics chips with internal laser diodes, configured to receive light signal from external optical sources which are just the four mini-TOSA laser device 210 in the implementation of the present invention shown in FIG. 3. This chip and package design make the manufacture of the silicon photonics chip 230 independent from any tuning process of the laser devices, thereby enhancing the robustness and reliability of the whole QSFP transceiver package.

In a specific embodiment, there are four mini-TOSA laser devices 210 in each QSFP package 100, which needs four MZ modulators correspondingly for the four channels of wavelengths of laser light. As mentioned in FIG. 2B, the silicon photonics chip 230 is coupled to the modulation driver module 234 by wire bonding. The driver module 234 is a four-channel silicon-germanium modulator driver for driving each of the four MZ modulators to modulate corresponding channels of laser light with different wavelengths into a desired optical signal. In a specific embodiment, after modulation, multiple lights with different wavelengths from the four mini-TOSA laser devices 210 are multiplexed and outputted via the fiber-to-silicon attachment module 231 again to a single optical fiber 211 connected to the optical output port 219 (with a LC or MPO connector) of the photonic transceiver 200.

On the other hand, the photonic transceiver device 200 is configured to receive optical signal via the optical input port 218 which is passed through a single fiber 211 to the silicon photonics chip 230 first via the fiber-to-silicon attachment module 231. Then a demultiplexer (not visible in FIG. 3 but built in the silicon photonics chip 230) transforms it into different channels with different wavelengths being detected by one or more PDs (not visible in FIG. 3) therein. Each wavelength signal is converted into an electrical signal and further processed to a digital signal at least by the TIA module 235 that is wire bonded to the silicon photonics chip 230. Since the optical signal contains at least four wavelengths being demultiplexed, the TIA module 235 is accordingly configured to be a 4-channel TIA for processing the digital signals for corresponding channels. Also mounted on the PCB 220 near the back edge 226 includes two port interface ASIC (ASIC) chips 201, 202 based on CMOS technology. One ASIC chip 201 is configured for electrical Tx module with 4×10 G (total of 40 Gbit/s) XLAUI (40 Gigabit Attachment Unit Interface) electrical interface for connecting to Ethernet and 4×25 G (total of 100 Gbit/s) CAUI (100 Gigabit Attachment Unit Interface) electrical interface, through which electrical signal can be transmitted out to Ethernet network via multiple metallic pin stripes 222 disposed as a pluggable electrical connector at the back edge 226 of the PCB 220. Another one ASIC chip 202 is configured for electrical Rx module with similar interfaces for receiving electrical signals from Ethernet network.

In a specific embodiment, the silicon photonics chip 230 is coupled to a two-channel PAM4 driver module 234 for driving two, single stage or multi stage, MZ modulators to provide optical signal modulation. The PAM4 driver module 234 includes a PAM encoder and a FEC encoder with CDR Rx I2C interface coupled to ASIC chip 201 for converting data to optical signal in 4×10 G to 4×25 G rate. The PAM4 driver module 234 is based on 28 nm CMOS technology. Additionally, the silicon photonics chip 230 is also coupled to a 2-channel TIA module 235 for processing electrical signals and converting them to digital signals. The electrical signals are converted by one or more PDs from demultiplexed light signals out of an incoming optical signal received from the optical input port 218. The 2-channel TIA module 235, also based on CMOS technology, includes PAM ADC/DSP CDR and PAM decoder with CDR Tx interface coupled to ASIC chip 202 for converting optical signal to digital signal in 4×10 G to 4×25 G rate and provide electrical interface communication with Ethernet network via the pluggable multiple metallic pin stripes 222.

In a specific embodiment, the mini-TOSA laser device 210 is laid in a reversed configuration with the corresponding laser output port 215 pointing toward the back edge 226 of the PCB 220, just opposite to that of the conventional transceiver device whose transmitter laser output port is pointed to the optical fiber output port 219 (with a LC connector) near the front end 105 of the photonic transceiver package 100 (see FIG. 1B). Such reversed configuration allows the built-in fiber-to-silicon photonics attachment module 231 on the silicon photonics chip 230 to directly face the laser output port 215 for properly coupling each single-mode fiber 212 to the silicon photonics chip 230. The silicon photonics chip 230 itself can be disposed closer to the ASIC chips 201/202 near the back edge 226 of the PCB 220 for simplification of circuit board wire bonding.

As shown in FIG. 3, all four mini-TOSA laser devices 210 are disposed on a common base structure 213 that is mounted on the PCB 220. Each laser device 210 is disposed in upside-down fashion with a cover member 313 being rested on a flat portion of the common base structure 213 while a module base member with its outer flat surface region facing upward (in this particular view of FIG. 3). In an embodiment, these flat surface regions of the laser devices 210 are conveniently being contacted with the lid member 110 of the transceiver package 100. As the module base member is designed for mounting (at inner side) the laser chip, the direct contact of the module base member (via its outer flat surface region) with the lid member 110 provides desired pathway for dissipating heat from the laser chip to the lid member 110 where an external heat sink usually is attached. Although without employing TEC devices, the package structure disclosed here still provide sufficient heat dissipation for the transceiver 100 equipped with four mini-TOSA laser devices 210. The common base structure 213 also includes four raised portions having four concave-shaped surface regions for respectively supporting corresponding cylindrical elements of the four mini-TOSA laser devices 210. More details about the packaging of mini-TOSA laser device are given below.

In yet another specific embodiment, the photonic transceiver 200 in this embodiment applies technology of wavelength-division multiplexing (WDM), each of the four mini-TOSA laser devices 210 uses a DFB FP laser diode chip to introduce laser light of different wavelengths. The four mini-TOSA laser devices 210 can provides four channels of 1270 nm, 1290 nm, 1310 nm, and 1330 nm in coarse wavelength division multiplexing (CWDM) spectrum which can be combined into one single-mode optical fiber via wavelength-division multiplexer for middle distance and long distance transmission. Since the accuracy of wavelength here is not important, no TEC module is needed for keeping the module temperature in stable range for locking the wavelength. Next, the received optical signal is performed a light-split process by the demultiplexer and the split optical signals are introduced to different channels. In this embodiment, except WDM technology, the photonic transceiver package 100 also can be applied to related optical communication technologies, such as binary phase shift keying modulation (BPSK), quadrature phase shift keying modulation (QPSK), conventional/coarse wavelength division multiplexing (CWDM), dense wavelength division multiplexing (DWDM), and optical add/drop multiplexer (OADM), reconfigurable optical add/drop multiplexer (ROADM).

Figure 4:
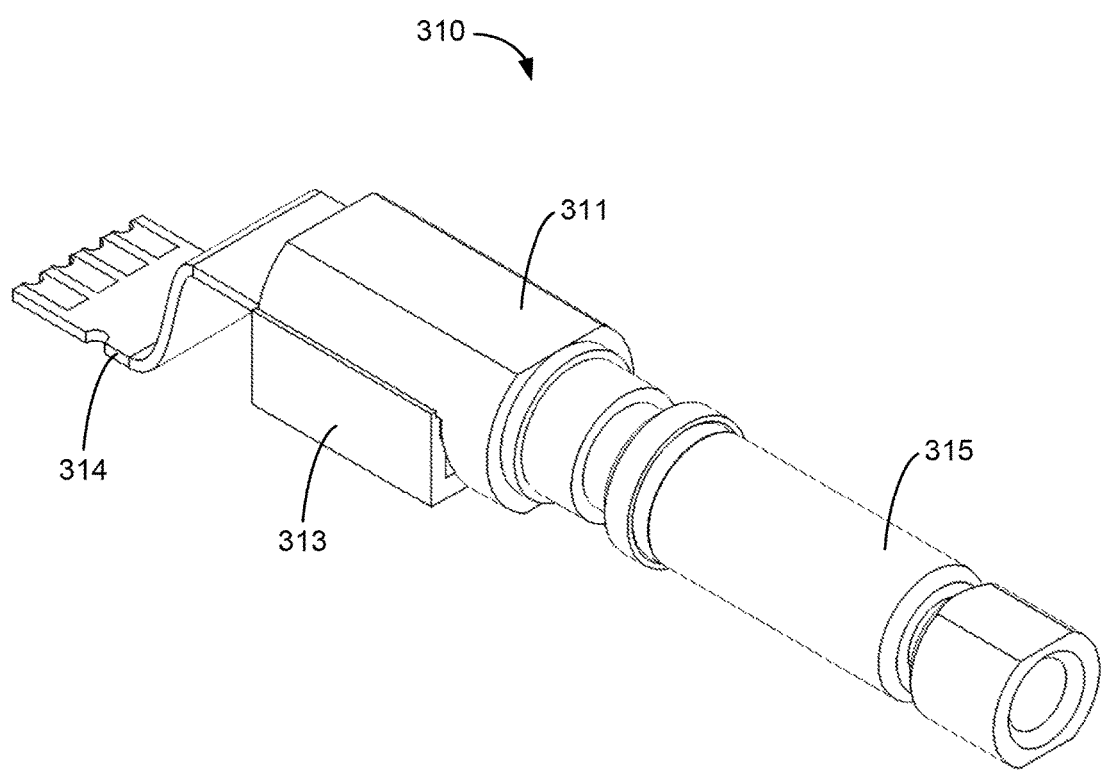
FIG. 4 is a perspective bottom view of a mini-TOSA laser device for the photonic transceiver according to the embodiment of the present invention.

FIG. 4 is a perspective bottom view of a mini-TOSA laser device for the photonic transceiver according to the embodiment of the present invention. This diagram is merely an example, which should not unduly limit the scope of the claims. One of ordinary skill in the art would recognize many variations, alternatives, and modifications. As shown, mini-TOSA laser device 310 includes a module base member 311 for supporting a transmitting module (not directly visible), a cover member 313 disposed above the transmitting module, a curved circuit board 314 disposed at one side of the module base member 311, and a cylindrical element 315 mounted at another side of the module base member 311. The module base member 311 is made of metal material and can assist the transmitting module mounted thereon to dissipate heat.

Figure 5:
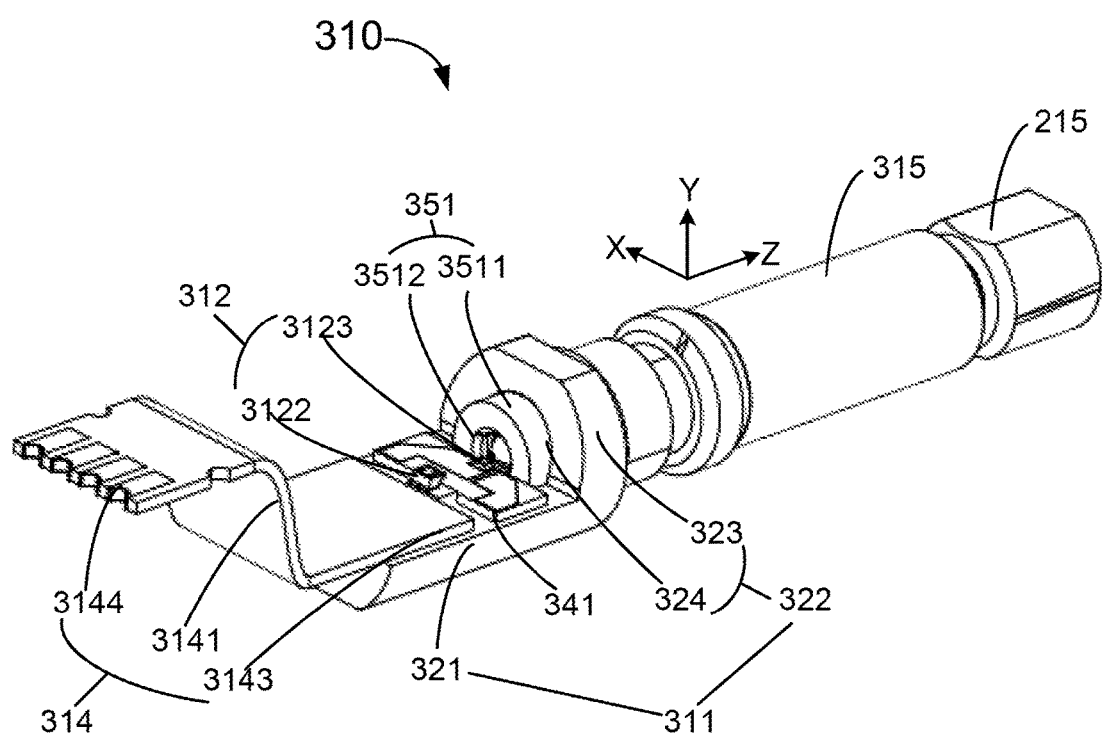
FIG. 5 is a perspective top view of a mini-TOSA laser device for the photonic transceiver without cover according to the embodiment of the present invention.

FIG. 5 is a perspective top view of the mini-TOSA laser device for the photonic transceiver without cover according to the embodiment of the present invention. This diagram is merely an example, which should not unduly limit the scope of the claims. One of ordinary skill in the art would recognize many variations, alternatives, and modifications. As shown, with the cover member 313 being removed, the module base member 311, though its outer surface facing downward, is substantially visible with a plane part 321, and an assembling part 322 is connected to one end the plane part 321. The plane part 321 is configured for attaching a submount 341 on which a transmitting module 312 is mounted and one end of the flex circuit board 314 which is bent in the middle region to have other end with electrical connections to be leveled at a different height for mounting with connection spots on the PCB 220. As seen in FIG. 3 the mini-TOSA laser device 310 is mounted upside-down on the PCB 220 with outer surface (not visible in this view of FIG. 5) of the module base member 311 facing upward to be contacted with the lid member of packaged transceiver 100. The submount 341 is usually made by high thermal conductivity material for facilitating heat dissipation from the transmitting module on the submount through the module base member to the lid member where external heat sink usually is attached.

Referring to FIG. 5, further, the transmitting module 312 comprises a monitor photo diode (MPD) chip 3122 on a LD-submount 3121 and a LD chip 3123 disposed on the submount 341. The assembling part 322 comprises an annular positioning portion 323 vertically connected to the end of the plane part 321. A positioning groove 324 is disposed inside the annular positioning portion 323 to allow the coupling lens 351 to be fitted therein corresponding to the submount 341 on plane part 321 nearby. The coupling lens 351 is aligned via the positioning groove 324 with the LD chip 3123 of the transmitting module 312 on the submount 341 for coupling laser light along axial direction into the cylindrical element 315. The coupling lens 351 comprises a metal outer part 3511 fixed within the annular hole 324, and at least one convex lens or spherical lens or biconvex lens 3512, disposed inside the metal outer part 3511. During manufacturing process, filler material is sealed into a space over the transmitting module 312 between the cover member 313 (facing downward in FIG. 4 and being removed in FIG. 5 with an upside-down view) and the plane part 321 of the module base member 311 by infusion or welding, in order to achieve the objective of sealing the transmitting module 312. The structure of the cylindrical element 315 will be described in detail in following content.

Referring to FIG. 5 again, the flex circuit board 314 comprises a board body 3141 bent in the middle region with a module electrical connection side 3143 disposed on one end of the board body 3141, and a PCB electrical connection port 3144 disposed on another end of the board body 3141 opposite to the electrical connection side 3143. The module electrical connection side 3143 of the board body 3141 is fixed on the plane part 321 of the module base member 311 by gluing. The transmitting module 312 is connected electrically to the module electrical connection side 3143 of the board body 3141 by welding or conductive epoxy. The PCB electrical connection port 3144 is connected to the connection spots of the printing circuits in the PCB 220 near the front edge 225 (see FIG. 3) by electrical welding, spot welding or slot connection, so as to transmit the excitation signal from the signal process module on the PCB 220 to the transmitting module 312.

The cylindrical element 315 of the mini-TOSA laser device 310 is mounted on the assembling part 322 correspondingly connecting to the laser output port 215 (a ferrule holding the optical fiber 212 which is shown in FIG. 3 but not shown in FIG. 5. In this embodiment, the cylindrical element 315 needs to be adjusted its parts relative to the coupling lens on both X-Y plane and Z-axis so as to properly couple the laser light emitted from the transmitting module 312 through the cylindrical element 315 and to output from laser output port 215 to the optical fiber 212.

Figure 6:
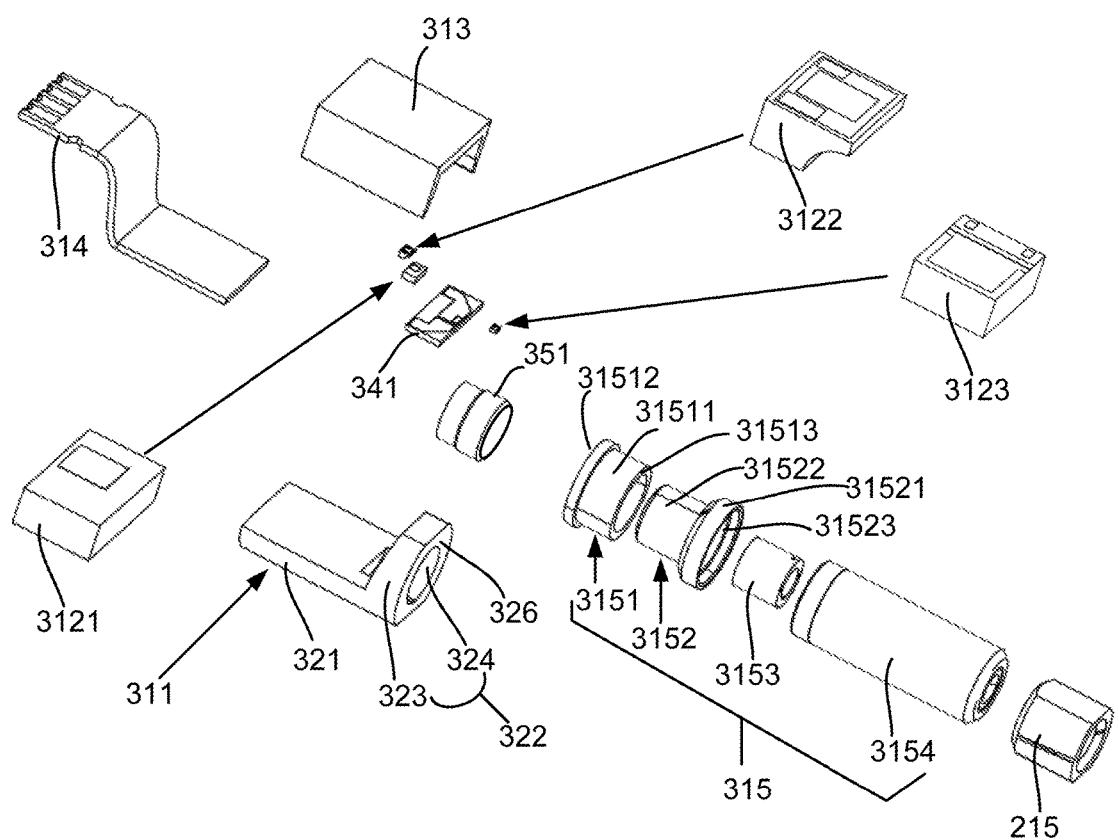
FIG. 6 is an exploded view of the mini-TOSA laser device according to an embodiment of the present invention.

FIG. 6 is an exploded view of the mini-TOSA laser device according to an embodiment of the present invention. This diagram is merely an example, which should not unduly limit the scope of the claims. One of ordinary skill in the art would recognize many variations, alternatives, and modifications. As shown, the cylindrical element 315 of the mini-TOSA laser device 310 can be disassembled into a plane adjusting mechanism member 3151, a light distance adjusting mechanism member 3152, an isolator 3153, and an optical fiber connection mechanism member 3154 (coupled with a fiber ferrule 215) arranged in order from left to right shown in FIG. 6. The isolator 3153, when being assembled, shall be in an axial location surrounded mainly by the light distance adjusting mechanism member 3152 and at least partially by the optical fiber connection mechanism member 3154. The optical fiber connection mechanism member 3154 is configured to couple with a fiber ferrule 215 for holding the single mode fiber 212 (see FIG. 3). Also shown in FIG. 6, the transmitting device 312 comprises the MPD (monitor photodiode) chip 3122 and the LD chip 3123, which are respectively shown with enlarged view and are mounted on the submount 341.

Figure 7:
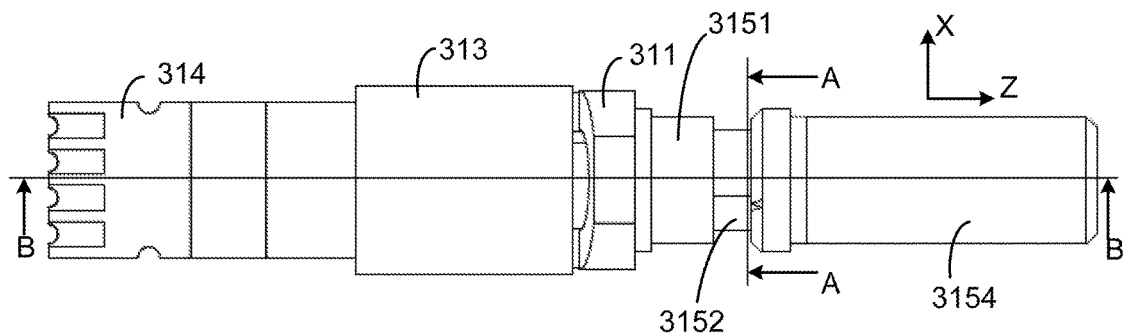
FIG. 7 is a top view of the mini-TOSA laser device according to an embodiment of the present invention.
Figure 8:
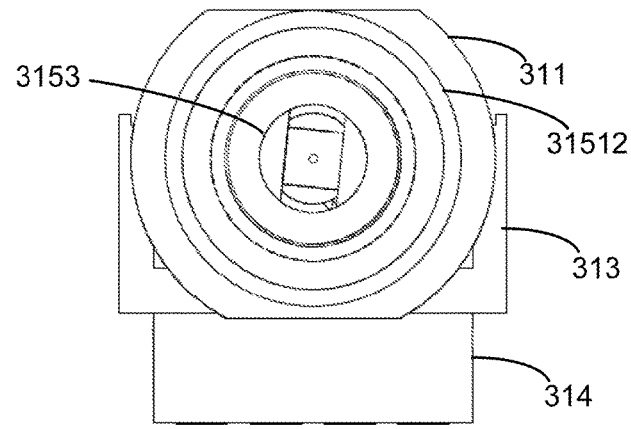
FIG. 8 is a side view of the mini-TOSA laser device according to the embodiment of the present invention.

FIG. 7 and FIG. 8 are respective top view and section view (along A-A line) of the mini-TOSA laser device according to a specific embodiment of the present invention. Please refer to FIG. 4 through FIG. 8 for detail structure of the mini-TOSA laser device 310. Referring to FIG. 6 and FIG. 7, the plane adjusting mechanism member 3151 is integrated on the assembling part 322 by welding after coupling calibration is completed, and space between the plane adjusting mechanism member 3151 and the assembling part 322 is sealed by infusing filler. For X-Y plane calibration, the assembling part 322 of the module base member 311 comprises a first connection plane 326 disposed at one side of the annular positioning portion 323 (with the positioning groove 324 in the middle). The plane adjusting mechanism member 3151 comprises a tubular body 31511 and second connection plane 31512 disposed at one side of the tubular body 31511. The second connection plane 31512 corresponds to the first connection plane 326. During the X-Y plane coupling calibration, a calibration device is used to adjust the relative position between the plane adjusting mechanism member 3151 and the assembling part 322 to align the tubular body 31511 with the coupling lens 351 in the positioning groove 324 of the assembly part 322. After the calibration is done, the first connection plane 326 is fixed on the second connection plane 31512 by laser spot welding, and then X-Y plane calibration is completed.

Further shown in FIG. 6, the light distance adjusting mechanism member 3152 is integrated into the plane adjusting mechanism member 3151 by welding after the coupling calibration is completed, and the space between them is sealed by infusing filler. For Z-axis calibration, in the plane adjusting mechanism member 3151, a groove track 31513 is disposed at the side of the mechanism body 31511 opposite to the second connection plane 31512. The light distance adjusting mechanism member 3152 comprises a body 31521 having an insert part 31522 disposed at one side of the body 31521 and the inserted part 31522 having a proper outer diameter operably fitting into and moving along the groove track 31513. After Z-axis calibration is completed, the light distance adjusting mechanism member 3152 is fixed on the plane adjusting mechanism member 3151 by laser welding or other welding methods.

Figure 9:
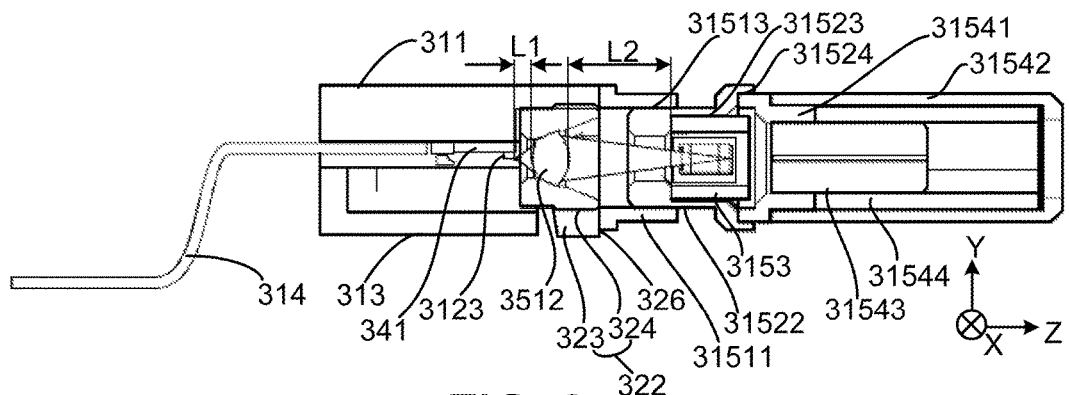
FIG. 9 is a cross sectional view of the mini-TOSA laser device according to the embodiment of the present invention.

FIG. 9 is a cross-sectional view of the mini-TOSA laser device along a central cut plane according to a specific embodiment of the present invention. Referring FIG. 9 for illustrating the Z-axis calibration easily, a distance from the LD chip 3123 of the transmitting module 312 to the coupling lens 3512 is defined as L1, and a distance from the coupling lens 3512 to the isolator 3153 is defined as L2. In this embodiment, the LD chip 3123 is disposed directly on the submount 341 in front of the coupling lens outer part 3511. The coupling lens 3512 is embedded inside the outer part 3511 with some recessed distance. Distance L1 is fixed value for tuning optical coupling to get maximum optical output before curing. But distance L2 from the coupling lens 3512 to the isolator 3153 is adjusted according to the light distance adjusting mechanism member 3152 and the groove track 31513 of the plane adjusting mechanism member 3151. As L1 is fixed, for better coupling efficiency, length of L2 tends towards a fixed value due to convergence characteristic of the coupling lens 3512. Therefore, the length of L2 depends on the length of L1. For biconvex lens, such configuration may increase the tolerance between the light distance adjusting mechanism member 3152 and the plane adjusting mechanism member 3151 since L2>L1 so that difficulty in process can be reduced.

In an embodiment, the isolator 3153 is disposed mainly within the light distance adjusting mechanism member 3152 coupled with the optical fiber connection mechanism member 3154. The isolator 3153 can be also disposed to connect one side of the external optical fiber, but it is not limited thereto. Referring FIG. 9 and FIG. 6, in a specific embodiment, the light distance adjusting mechanism member 3152 comprises a first disposal slot 31523 disposed at another side of the body 31521 opposing to the inserted part 31522 and the first disposal slot 31523 is configured to mount the isolator 3153. A second disposal slot 31524 is disposed at the same side of the body 31521 for engaging with the optical fiber connection mechanism member 3154. The inner diameter of the second disposal slot 31524 is larger than that of the first disposal slot 31523, so as to form an outer ring region for assembling the optical fiber connection mechanism member 3154. On the other hand, the optical fiber connection mechanism member 3154 comprises a coupling portion 31541 having a first inserted part on one side designed for fitting in the second disposal slot 31524. Additionally, the optical fiber connection mechanism member 3154 comprises a sleeve body 31542, a light coupling channel 31543, and a positioning portion 31544. The sleeve body 31542 is configured to couple with a second inserted part on opposite side of the coupling portion 31541. The positioning portion 31544 is inserted inside the sleeve body 31542. The light coupling channel 31543 is further inserted partially in one end of the positioning portion 31544, located in the axial direction for light coupling. Another end of the positioning portion 31544 is configured for coupling an external optical fiber (via a fiber ferrule 215 which is not shown).

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A photonic transceiver apparatus in QSFP package comprising:
   a case, comprising a base member, two partial side members being connected by a joint piece and coupled to the base member, a lid member including a cover coupled to the two partial side members and the base member to provide a spatial volume with an opening at a back end of the base member;
   a PCB, installed inside the spatial volume over the base member, including a board body extended from a front edge to a back edge, the back edge being near the opening at a back end of the base member, the board body comprising an array of metallic pin stripes at the back edge to form a pluggable electrical interface connector;
   multiple optical transmitting devices mounted in parallel on a common support member resting on the PCB near the front edge with corresponding laser output port aimed toward the back edge;
   a silicon photonics chip, mounted on the PCB, including a fiber-to-silicon attachment module to couple with a first fiber from each of the laser output port;
   an optical input port and an optical output port disposed together on a front end of the base member near the joint piece for the two partial side members and respectively back connected via a pair of second fibers to the fiber-to-silicon attachment module; and
   a pull handle having two arms coupled to respective front ends of the two partial side members.

2. The apparatus of claim 1 wherein each of the optical input port and the optical output port comprises a LC connector accessible from the front end by an optical fiber in a mate LC connector.

3. The apparatus of claim 1 wherein the optical input port and the optical output port are configured to fit a multi-fiber push-on (MPO) connector accessible from the front end by two optical fibers.

4. The apparatus of claim 1 wherein each of the multiple optical transmitting devices comprises a module base member and a cover member to enclose a space for holding a transmitting module and a coupling lens, the transmitting module being mounted on a submount disposed on the module base member and the coupling lens being disposed on the module base member next to the transmitting module.

5. The apparatus of claim 1 wherein the silicon photonics chip comprises multiple silicon-based MZ (Mach Zehnder) modulators, a plurality of photo diode detectors, a wavelength-division multiplexer, and a wavelength-division demultiplexer, the multiple silicon-based MZ modulators modulating light of different wavelengths received via the fiber-to-silicon attachment module from respective laser output ports of the multiple optical transmitting devices, the wavelength-division multiplexer being coupled to the multiple silicon-based linear MZ modulators to combine the light of different wavelengths after modulation before outputting via the fiber-to-silicon attachment module to the optical output port, and the wavelength-division demultiplexer being coupled to the fiber-to-silicon attachment module to demultiplex an optical signal from the optical input port to a light with multiple wavelengths respectively detected by the plurality of photo diode detectors.

6. The apparatus of claim 1 wherein the multiple optical transmitting devices comprises at least four laser devices in mini transmit optical sub-assembly package.

7. The apparatus of claim 1 further comprising a QSFP specification pluggable to network system allowing data rates of 4×10 Gbit/s, 4×28 Gbit/s or higher.

8. The apparatus of claim 1 wherein the multiple optical transmitting devices are reversely laid on the PCB such that the laser output ports are aiming backward from the optical input port and the optical output port.

9. The apparatus of claim 1 wherein the fiber-to-silicon attachment module comprises multiple V-grooves fabricated on the silicon photonics chip for coupling optical fibers to silicon waveguides.

10. The apparatus of claim 1 wherein the silicon photonics chip is configured to receive multiple light signals externally from the multiple optical transmitting devices via the fiber-to-silicon attachment module coupled with the first fiber from each laser output port.

11. The apparatus of claim 4 wherein the module base member comprises a plane part connected with an assembly part, the plane part having an inner flat surface for attaching the submount, the assembly part having a positioning groove configured to dispose the coupling lens therein.

12. The apparatus of claim 4 wherein the cover member is configured to be disposed on the common support member mounted on the PCB.

13. The apparatus of claim 4 wherein the space comprises a filler material filled by infusion and sealed by welding.

14. The apparatus of claim 5 further comprising a pair of ASIC chips mounted on the PCB near the back edge respectively coupled with a modulation driver module and a TIA module, both being wire bonded to the silicon photonics chip.

15. The apparatus of claim 11 wherein each of the multiple optical transmitting devices further comprises a circuit board having a first flat end region mounted on the plane part connected to a bended middle region further connected to a second flat end region at a different height level with metallic pin stripes for connecting to connection spots near the front edge of the PCB.

16. The apparatus of claim 11 wherein the transmitting module comprises a monitor photodiode (MPD) chip and a laser diode (LD) chip, both being mounted on the submount that us attached to the module base member for the LD chip to be aligned with the coupling lens in the positioning groove at a predetermined first distance.

17. The apparatus of claim 11 wherein the module base member comprises an outer flat surface, opposing to the inner flat surface, for forming a contact with the lid member to direct dissipate heat from the transmitting module to any external heat sink attached to the lid member.

18. The apparatus of claim 14 wherein the modulation driver module is based on CMOS technology including a PAM encoder and a FEC encoder with 4 channels CDR Rx I2C interface to drive the multiple silicon-based MZ modulators for modulating light from the multiple optical transmitting devices.

19. The apparatus of claim 14 wherein the TIA module is based on CMOS technology including PAM ADC/DSP CDR and PAM decoder with 4 channels CDR Tx interface to provide electrical interface communication with Ethernet network via the pluggable electrical interface connector.

20. The apparatus of claim 16 wherein each of the multiple optical transmitting devices comprises a first cylindrical member with plane adjusting mechanism, a second cylindrical member with light distance adjusting mechanism, an isolator, and a third cylindrical member with optical fiber connection mechanism, the first cylindrical member being coupled with the assembly part of the module base member, the second cylindrical member being coupled to the first cylindrical member and mounting the isolator, the third cylindrical member being coupled to the second cylindrical member and having a positioning portion to hold a light coupling channel.

21. The apparatus of claim 16 wherein the LD chip comprises a FP photo diode in DFB package capable of producing a laser light with wavelength in one of CWDM channels selected from 1270 nm, 1290 nm, 1310 nm, and 1330 nm.

22. The apparatus of claim 20 wherein the first cylindrical member comprises a coupling plane configured to be adjusted in X-Y plane when being attached with the assembly part to align with the coupling lens in the positioning groove and comprises a groove track for being engaged by the second cylindrical member.

23. The apparatus of claim 20 wherein the second cylindrical member comprises a body having an inserted part on a first end of the body and a first disposal slot on the second end of the body for mounting the isolator therein, the inserted part having an outer diameter fitted with the groove track so that the inserted body part is movable along the groove track to allow the mounted isolator to be calibrated in Z-axis with a second distance from the coupling lens, the second distance being larger than the first distance.

24. The apparatus of claim 23 wherein the second cylindrical member further comprises a second disposal slot on the second end of the body for engaging with the third cylindrical member, the second disposal slot having an inner diameter larger than that of the first disposal slot.

25. The apparatus of claim 24 wherein the third cylindrical member further comprises a coupling portion engaged with the second disposal slot and another end being coupled with a sleeve body to enclose the positioning portion with a light coupling channel, the light coupling channel being calibrated with the isolator and an optical fiber coupled with the positioning portion via a ferrule ring.

* * * * *